(12) United States Patent
Kim et al.

(10) Patent No.: US 6,581,651 B2
(45) Date of Patent: Jun. 24, 2003

(54) GAS FILLING APPARATUS AND METHOD FOR GAS SHOCK ABSORBER

(75) Inventors: Woo Jin Kim, Kyonggi-do (KR); Yei Seak Park, Jeollabuk-do (KR); Byung Kuk Kang, Kyonggi-do (KR)

(73) Assignee: Mando Corporation (KR)

( * ) Notice: Subject to any disclaimer, the term of this patent is extended or adjusted under 35 U.S.C. 154(b) by 0 days.

(21) Appl. No.: 10/033,834

(22) Filed: Dec. 26, 2001

(65) Prior Publication Data

US 2002/0185193 A1 Dec. 12, 2002

(30) Foreign Application Priority Data

Jun. 7, 2001 (KR) .................................... 2001-0031679

(51) Int. Cl.$^7$ ............................................... B65B 1/04
(52) U.S. Cl. .......................... 141/67; 141/37; 141/98; 188/322.21; 267/64.28
(58) Field of Search ............................. 141/67, 4, 37, 141/44, 46, 63, 64, 98, 311 R, 312, 325, 368, 372, 384, 385, 383; 188/322.21; 267/64.28

(56) References Cited

U.S. PATENT DOCUMENTS 4,483,377 A * 11/1984 Cubalchini ................. 141/349
5,524,871 A * 6/1996 Muller et al. ............ 267/64.28
5,579,814 A * 12/1996 Jones et al. ................. 141/383
5,598,905 A * 2/1997 Rudloff ................. 188/322.16

* cited by examiner

Primary Examiner—Steven O. Douglas
(74) Attorney, Agent, or Firm—Anderson Kill & Olick, PC

(57) ABSTRACT

A gas filling apparatus for gas shock absorber comprises the assembly location correction unit, a gas filling unit, wherein the gas filling unit includes a rod chucking unit, a calking jig, an oil seal pushing unit, and a jig housing. A gas filling method for gas shock absorber comprises the steps of correcting the assembly location of the tube assembly and the rod guide, clamping the base shell assembly; lowering the gas filling unit primarily, lowering the rod chucking unit, lowering the collet housing device; letting the oil seal break away, filling the gas, lowering the gas filling unit secondarily and simultaneously calking primarily, and calking secondarily the base shell assembly. The apparatus and the method need not punch a hole for filling the gas at a circumference of the base shell assembly when filling the gas into a base shell assembly of the gas shock absorber.

15 Claims, 15 Drawing Sheets

GAS FILLING APPARATUS AND METHOD FOR GAS SHOCK ABSORBER

FIELD OF THE INVENTION

The present invention relates to a gas filling apparatus and method for a gas shock absorber; and, more particularly, to an apparatus and method capable of filling a gas into a base shell assembly of the gas shock absorber before calking, wherein the apparatus and method eliminate the necessity to punch a hole for filling the gas at a circumference surface of the base shell assembly.

BACKGROUND OF THE INVENTION

In general, a vehicle has a suspension system so as to block a shock propagating from ground to a vehicle driver and protect a vehicle body.

The suspension system includes a spring and a gas shock absorber, wherein the spring absorbs the shock transferred from the ground and the shock absorber damps vibration generated from the spring, thereby suppressing the expansion of the spring.

As shown in FIG. 1, the gas shock absorber includes a base shell assembly 75, a rod assembly 71, a rod guide 73, and a oil seal 74, wherein the base shell assembly 75 has a cylinder structure; the rod assembly 71 is built inside the base shell assembly in order to perform a reciprocating motion, wherein the inside of the base shell assembly 75 is filled with an oil and a gas.

Meanwhile, the gas filling method in a prior art is as follows.

First of all, a hole for filling gas is formed by punching at a circumference surface of the base shell assembly 75. The oil is poured in a tube assembly and the base shell assembly 75 through the punched hole. Thereafter, the rod assembly 71 is fixed in the tube assembly and the rod guide 73 and the oil seal 74 are combined in the base shell assembly 75 and thereafter top of the base shell assembly 75 is calked by a calking device.

After completely sealing the top of the base shell assembly 75 through the calking device, the gas is filled therein through a gas filling hole. Thereafter, the gas filling hole is completely welded.

The gas filling method in the prior art, however, has an inconvenience in that the extra hole needs to be punched at the circumference surface of the base shell assembly. This has a problem in that the base shell assembly is damaged and the durability thereof is deteriorated.

To solve the problem mentioned above, a gas filling apparatus and method was suggested by the present applicant, wherein an extra hole needs not to be punched at the base shell assembly and gas is filled into the gas shock absorber through a gap located between a rod and a rod guide by using a filling jig and then top portions of the base shell assembly is calked.

However, this had a problem in that either the surface of the rod or the oil seal is damaged while the filling jig is inserted therebetween.

SUMMARY OF THE INVENTION

It is, therefore, an object of the present invention to provide a gas filling apparatus and method for the gas shock absorber in which there is no need to punch an extra hole on the base shell assembly and also a rod and an oil seal is not damaged during gas filling process.

In accordance with one aspect of the present invention, there is provided a gas filling apparatus for filling a gas in a base shell assembly of a shock absorber, including: an assembly location correction unit for putting a tube assembly and a rod guide at predetermined positions, respectively, in the base shell assembly by pushing a rod lifted by oil pressure filled in the base shell assembly; and a gas filling unit including a rod chucking unit, a calking jig, an oil seal pushing unit, and a jig housing, wherein the gas filling unit is capable of sealing top of the base shell assembly by calking temporarily after the gas is filled therethrough.

In accordance with another aspect of the present invention, there is provided a gas filling method, including the steps of: correcting an assembly location of a tube assembly and a rod guide in order to fix a position thereof; clamping a base shell assembly transferred to a gas filling unit; lowering the gas filling unit primarily for sealing the top of the base shell assembly by a calking jig; lowering a rod chucking unit for entering a bolt portion of the rod in a collet; lowering a collet housing device for chucking the bolt portion of the rod by the collet; making an oil seal deviate from the top of the base shell assembly, thereby lifting the rod chucking unit; filling a gas between the oil seal and the top of the base shell assembly; lowering the gas filling unit secondarily for inserting the oil seal into the top of the base shell assembly and simultaneously, calking primarily the top of the base shell assembly by a calking projection projected on inside of the calking jig; and calking secondarily the base shell assembly calked primarily, thereafter separating it from the gas filling unit.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Now, a preferred embodiment of the present invention will be described hereinafter with reference to FIG. 1 to FIG. 18.

Figure 1:
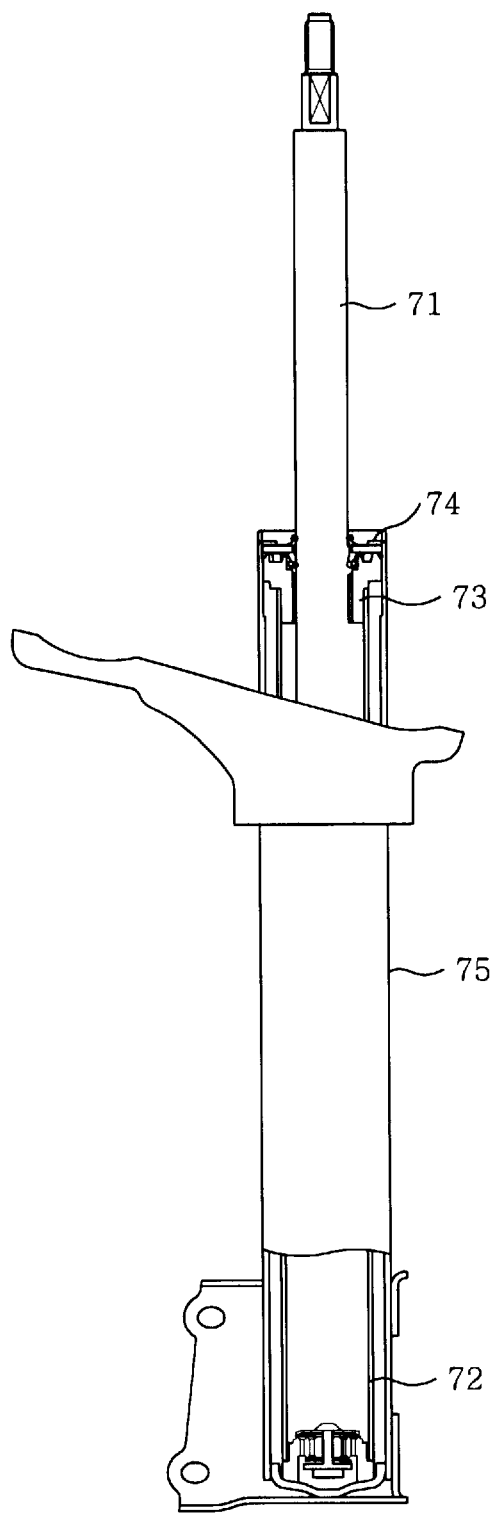
FIG. 1 is a frontal view of a general gas shock absorber.

FIG. 1 is a frontal view of a general gas shock absorber, wherein the gas shock absorber includes a base shell assembly 75, a rod 71, a tube assembly 72, a rod guide 73, and an oil seal 74, wherein the base shell assembly 75 has an oil and a gas mixed therein at a predetermined ratio. Meanwhile, the gas shock absorber has a different length according to required damping characteristics or types of vehicles.

Figure 2:
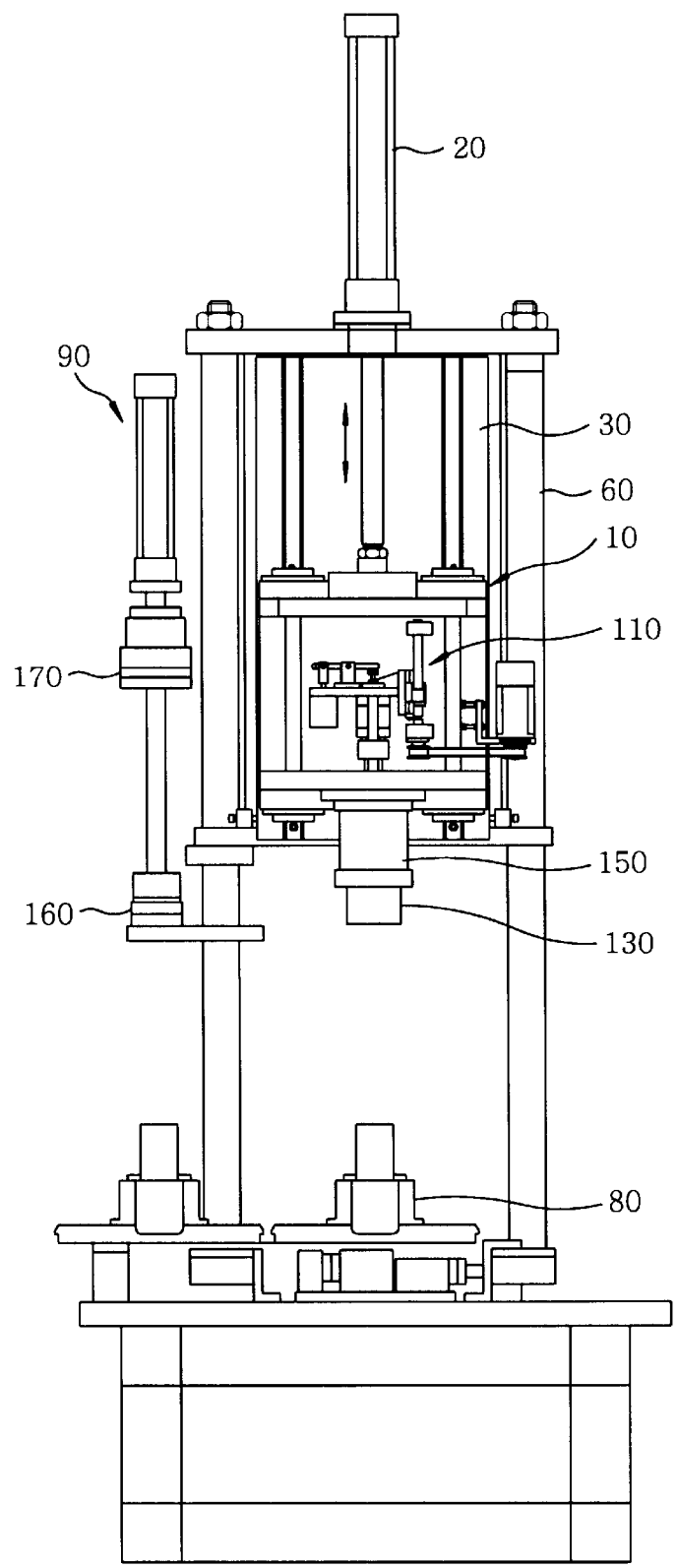
FIG. 2 shows a frontal view of a gas filling apparatus in accordance with the present invention.
Figure 3:
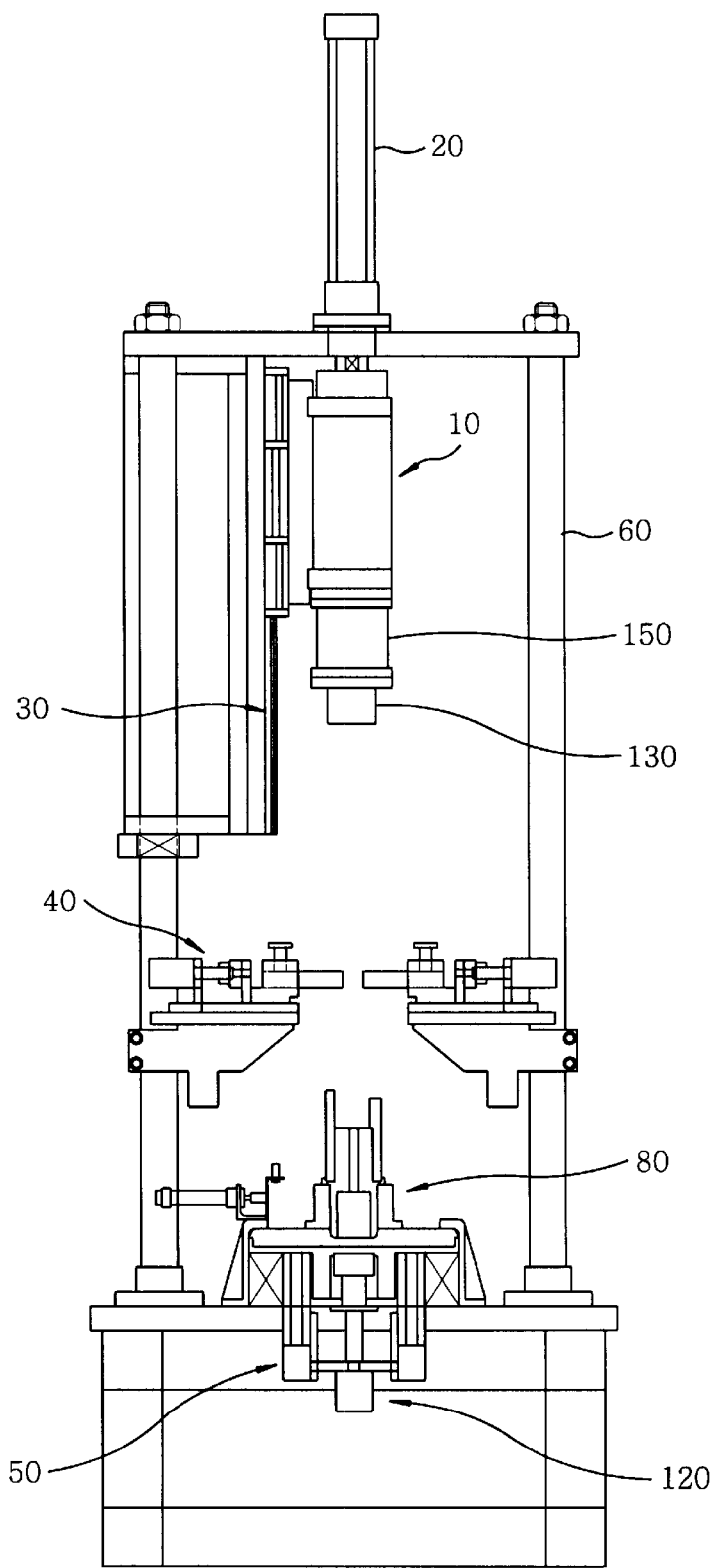
FIG. 3 offers a side view of the gas filling apparatus in accordance with the present invention.

FIG. 2 shows a frontal view of the gas filling apparatus in accordance with the present invention and FIG. 3 is a side view of FIG. 2.

As described in FIG. 2, the gas filling apparatus for filling the gas inside the base shell assembly 75 comprises an assembly location correction unit 90 and a gas filling unit 10 including a rod chucking unit 110, a calking jig 130, and a jig housing 150, wherein the assembly location correction unit 90 makes a tube assembly 72 and the rod guide 73 duly positioned at the inside of the base shell assembly 75 by pushing down the rod 71 raised by the filled oil pressure; the gas filling unit is capable of sealing by a temporary calking after filling the gas through top of the base shell assembly.

The gas filling unit 10 is supported by a plurality of frame 60 and is combined with a gas filling unit elevating guide 30, e.g., a linear motor guide installed in vertical direction. The gas filling unit 10 and the gas filling unit elevating guide 30 are moved in a vertical direction by an elevating actuator 20.

At bottom of the gas filling unit 10, a base shell assembly fixing unit 40 supported by the frame 60 is installed and firmly clamps the base shell assembly 75.

A pallet conveying unit 50 which is moved by a conveyor system (not shown) is positioned below the base shell assembly fixing unit 40. The base shell assembly 75 is conveyed to the gas filling unit 10 by putting on the pallet conveying unit 50. The bottom of the base shell assembly 75 is supported by the pallet 80.

The tube assembly 72, the rod guide 73, and the rod 71 assembled and positioned inside the base shell assembly 75 through the antecedent process have an unstable condition, since they are not fixed yet and the oil has already been filled in the base shell assembly 75. If a gas filling and a calking process are performed under such an unstable condition, the tube assembly 72 and the rod guide 73 may fail to be installed at a predetermined position in the base shell assembly 75. Accordingly, it is preferable that such unstable condition is eliminated before the base shell assembly 75 is conveyed to the gas filling unit 10.

The assembly location correction unit 90 is installed in order to prevent the above problem at left side of the gas filling unit 10.

As described in FIG. 2, the assembly location correction unit 90 includes a base shell assembly clamping unit 160 and a rod pushing unit 170. The assembly location correction unit 90 makes the tube assembly 72 and the rod guide 73 be put firmly in the base shell assembly 75 at respective predetermined positions by pressing down the rod 71, so that the rod guide 73 and the tube assembly 72 may not be broken away from the base shell assembly and the base shell assembly 75 and the tube assembly 72 may not be dislocated when filling the gas or calking primarily the top of the base shell assembly 75.

Figure 4:
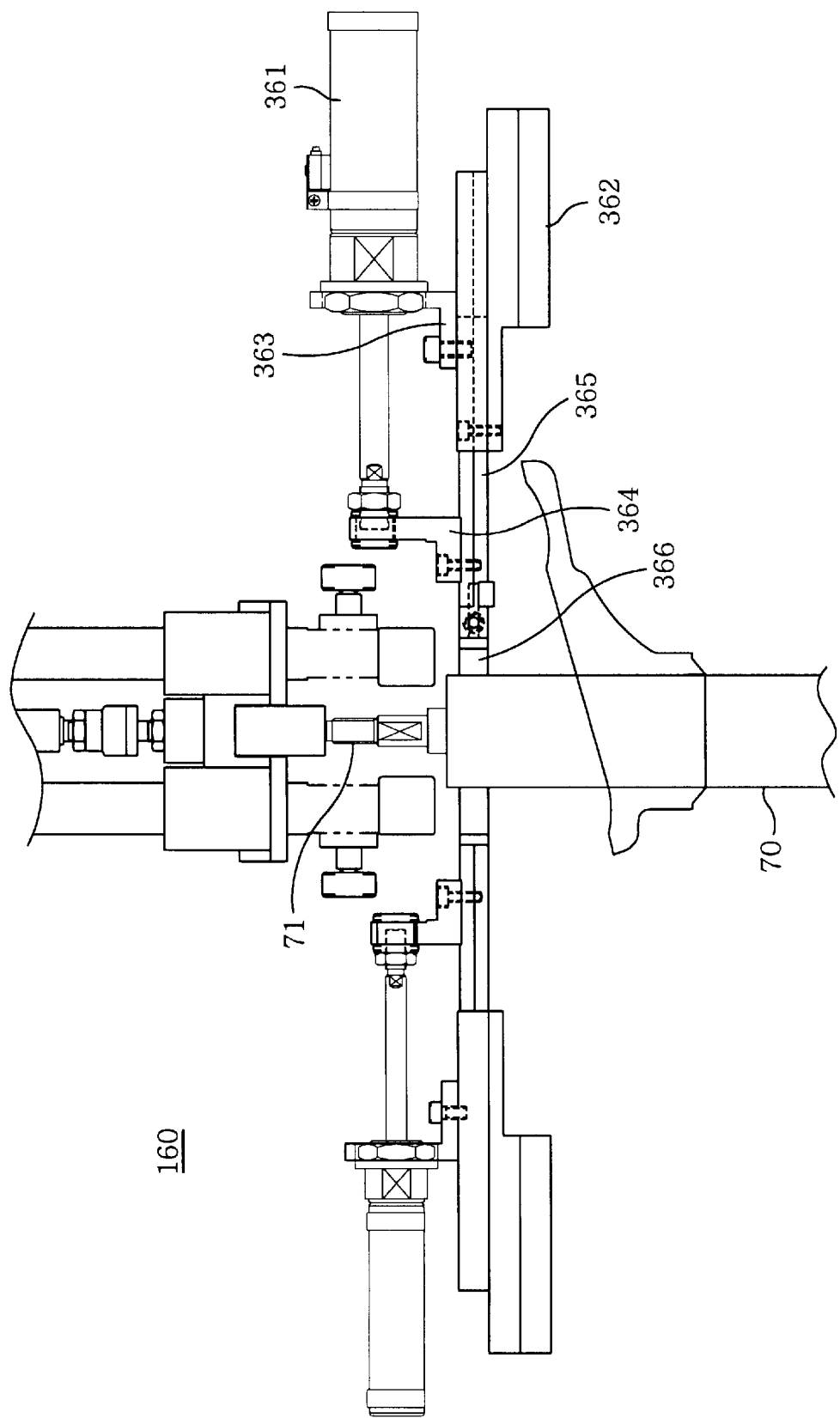
FIG. 4 provides a frontal view of a base shell clamping unit in accordance with the present invention.
Figure 5:
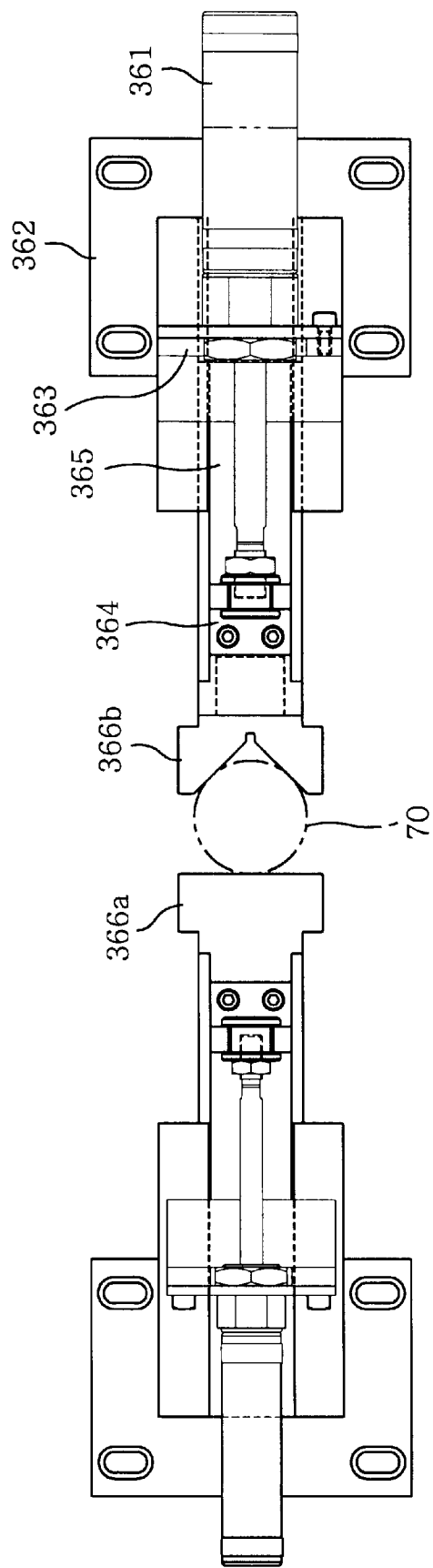
FIG. 5 represents a plane view of the base shell clamping unit in accordance with the present invention.
Figure 6:
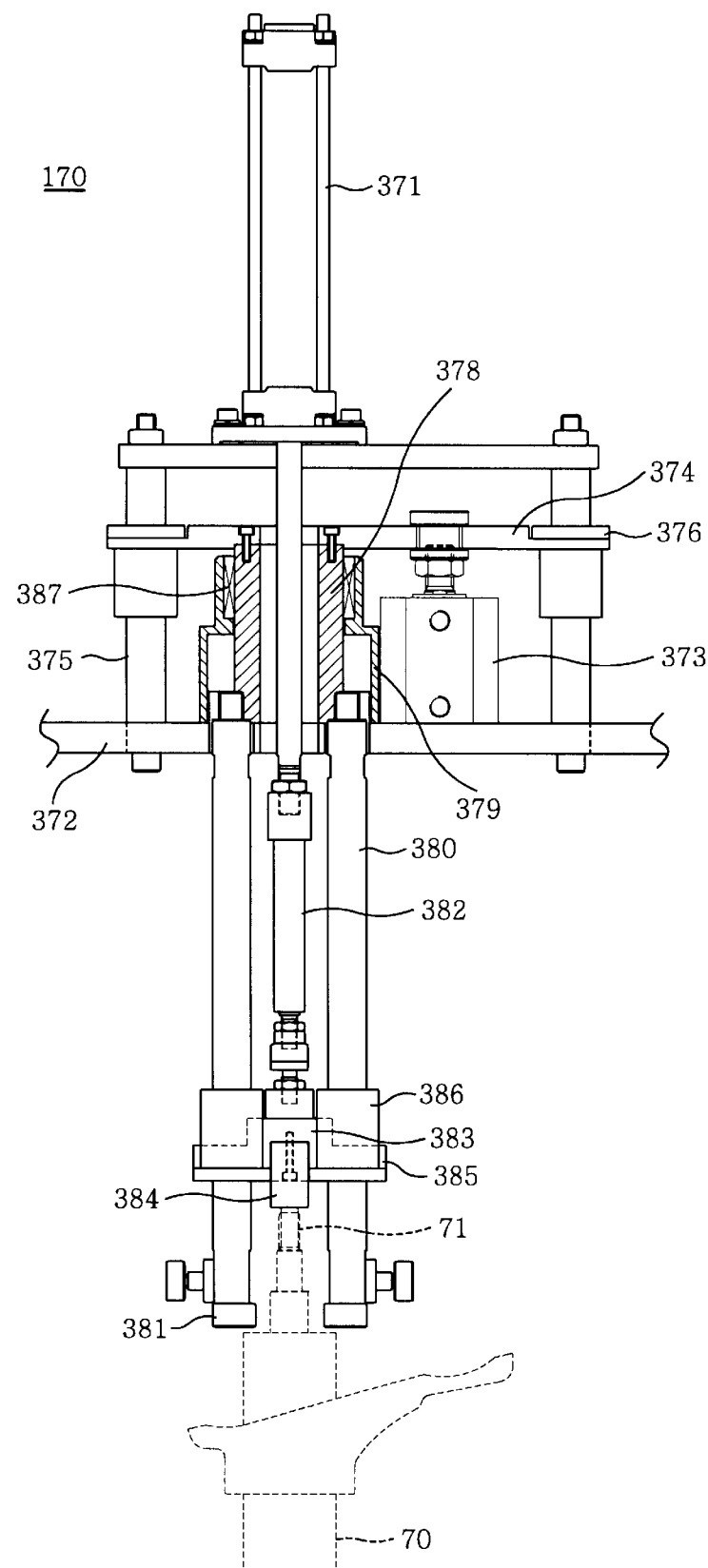
FIG. 6 shows a frontal view of a rod pushing unit in accordance with the present invention.

FIGS. 4 and 5 provide a frontal view and a plane view of the base shell clamping unit 160, respectively, in accordance with the present invention. FIG. 6 shows a frontal view of the rod pushing unit 170 in accordance with the present invention.

As shown in FIGS. 4 and 5, the base shell clamping unit 160 clamps the base shell assembly 75 conveyed from the antecedent process to a position right below the rod pushing unit 170, wherein the base shell clamping unit 160 includes two cylinders 361, two plates 362, two brackets 363, two guide blocks 364, two guides 365, and two joint holders 366.

Each cylinder 361 for providing a reciprocating motion in a horizontal direction is installed on a corresponding plate 362 by a corresponding bracket 363 located next to a corresponding end of the base shell assembly 75. The guide 365 is slidably combined at an end of each plate 362, wherein the guide 365 is reciprocatingly slid along a direction of a reciprocating motion of the cylinders 361.

An end portion of a rod of each cylinder 361 is engaged with the guide 365 by the guide block 364. Thus, the guide 365 reciprocates by the reciprocating motion of the cylinder 361. Each joint holder 366 is installed at apex of each guide 365. Each joint holder 366 has a V-block structure in order to make a close contact with an outer surface of the base shell assembly 75 having a cylindrical structure and clamp the base shell assembly 75 tightly. Preferably, one of the two joint holders 366 is provided as a planar type joint holder 366a and the other is provided as a V-block type joint holder 366b. This is effective to maintain the center of the base shell assembly 75, since the base shell assembly 75 and the two holders are supported together at three points thereof.

As shown in FIG. 6, the rod pushing unit 170 includes an upper and a lower fixing plate 372, a cylinder 371, a joint bar 382 and a rod-pressurizing plate 383. The upper fixed plate is installed above the lower fixing plate by a pair of the posts 375 installed in a vertical direction. The cylinder 371 on the upper fixing plate 372 is installed and provides a reciprocating motion in a vertical direction. The joint bar 382 and the rod-pressurizing plate 383 are installed by combining with the apex of the rod of the cylinder 371 in order to pressurize top portion of the rod 71.

Additionally, a compact cylinder 373 is installed on the lower fixing plate and provides a reciprocating motion in a vertical direction. By horizontally installing a driving plate 374 on a rod end of the compact cylinder 373, the driving plate 374 is vertically operated by the compact cylinder 373. Both ends of the driving plate 374 are guided by a pair of the post 375 through the intermediary of a ball bush 376. At bottom of the driving plate 374, a flange 378 of a cylindrical structure is screw-coupled around the rod of the cylinder 371. At bottom of the flange 378, a guide bar 380 is vertically installed in parallel to the rod of the cylinder 371. At an end portion of the guide bar 380, an oil seal-pushing portion 381 is installed in order to pressurize the oil seal 74.

As shown in FIG. 6, the rod of the cylinder 371 and a rod pressurizing plate 383 are connected via a joint bar 382. The rod pressurizing plate 383 is slidably engaged with a pair of the guide bar 380 through a guide plate 385 and a ball bush 386. At center portion of the rod pressurizing plate 383, the rod pushing portion 384 is combined in such a manner that the height thereof can be adjustable by a screw in a vertical direction.

Moreover, a housing 379 is installed on the lower fixing plate 372 and slidably engaged with the outer surface of the flange 378. The housing 379 and the flange 378 can move stably up and down. A constant space portion is formed in the housing 379 so that the flange 378 and the guide bar 380 are not interfered by each other. The housing 379 is slidably contacted with the remainder except the space portion and an oilless bush 387 is fixated in the sliding contact portion.

If the base shell assembly 75 arrives at the assembly location correction unit 90 through the antecedent process, the outer surface of the base shell assembly 75 is clamped by the base shell assembly clamping unit 160. Then, the rod pushing unit 170 independently pressurizes the oil seal 74 and the rod 71 and makes them to be located at respective predetermined positions.

Herein, the rod pushing unit 170 operates as follows.

If the compact cylinder 373 is compressed, the driving plate 374, the flange 378, the guide bar 380, and the oil seal-pushing portion 381 move down to thereby push down the top of the oil seal 374. Subsequently, by extending the cylinder 371 downward, the joint bar 382 and the rod pressurizing plate 383 are lowered down so that the top of the rod 71 is pushed by the rod-pushing portion 384. Herein, the more the rod 71 is inserted into the base shell assembly 75, the more the inner space of the base shell assembly 75 is reduced to thereby compress the air therein. Therefore, the oil seal 74 is pushed upward as the air contained in the base shell assembly 75 is compressed. Meanwhile, since the oil seal-pushing portion 381 pressurizes the oil seal 74, the compressed air is exhausted to the outside by extending the compact cylinder 373 and slowly lifting the oil seal-pushing portion 381.

As described above, since the tube assembly 72 and the rod guide 73 assembled temporarily in the base shell assembly 75 can be located at the respective predetermined positions, the arrival failure and the breakaway of the base shell assembly 75 can be avoided.

The assembly location correction step can be selectively omitted depending on the pulling extent of the rod 71 transferred from the antecedent process. That is, under the condition that the oil is filled in the base shell assembly 75, if the position of the rod 71 is lower than the predetermined height, the assembly location correction step can be omitted.

Meanwhile, it is preferable to perform the assembly location correction step only in the case that the position of the rod 71 is higher than the predetermined height. To perform this, a sensor is additionally attached to detect the pulling extent of the rod 71.

Figure 7:
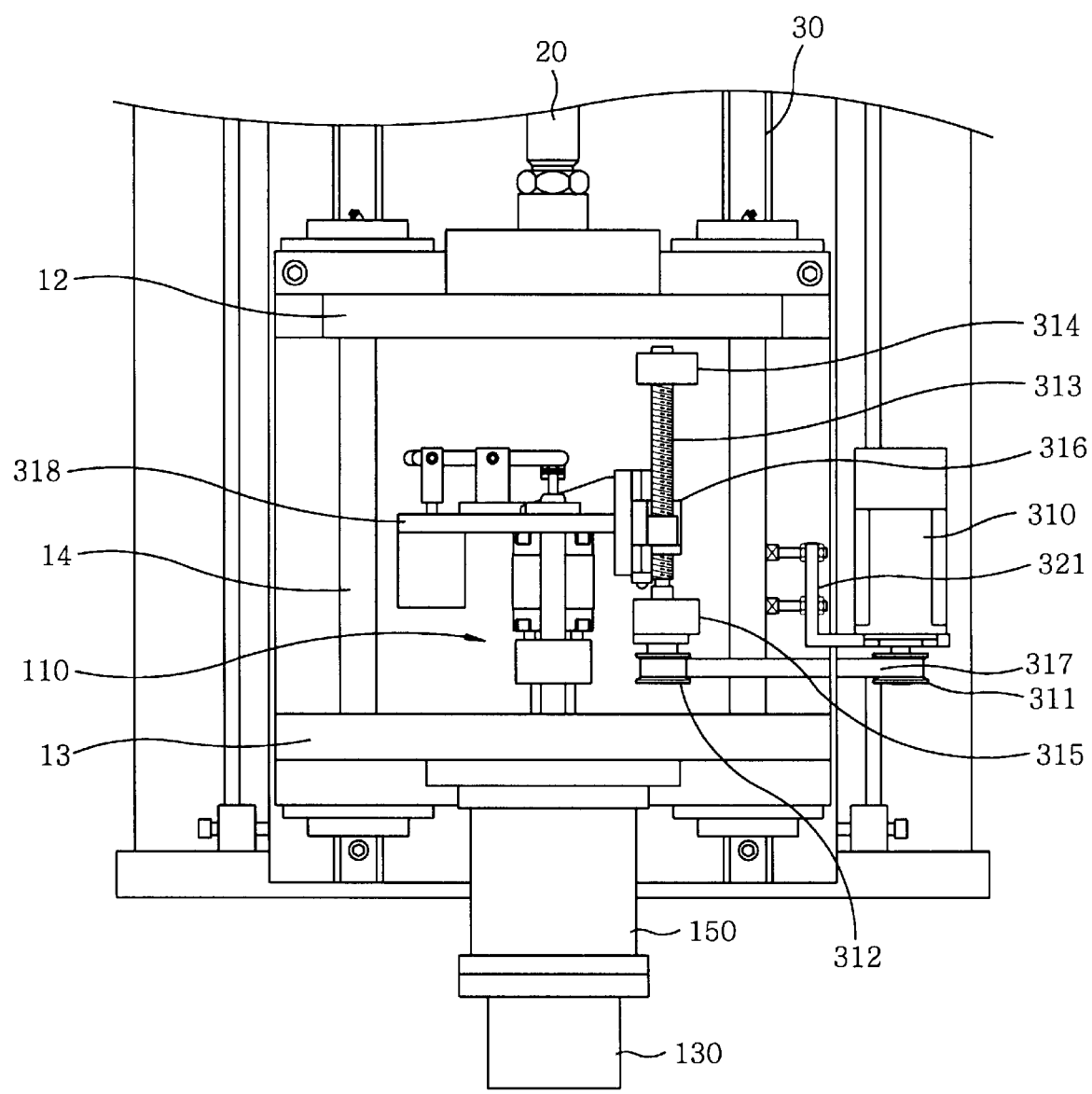
FIG. 7 offers a frontal view of a gas filling unit in accordance with the present invention.
Figure 8:
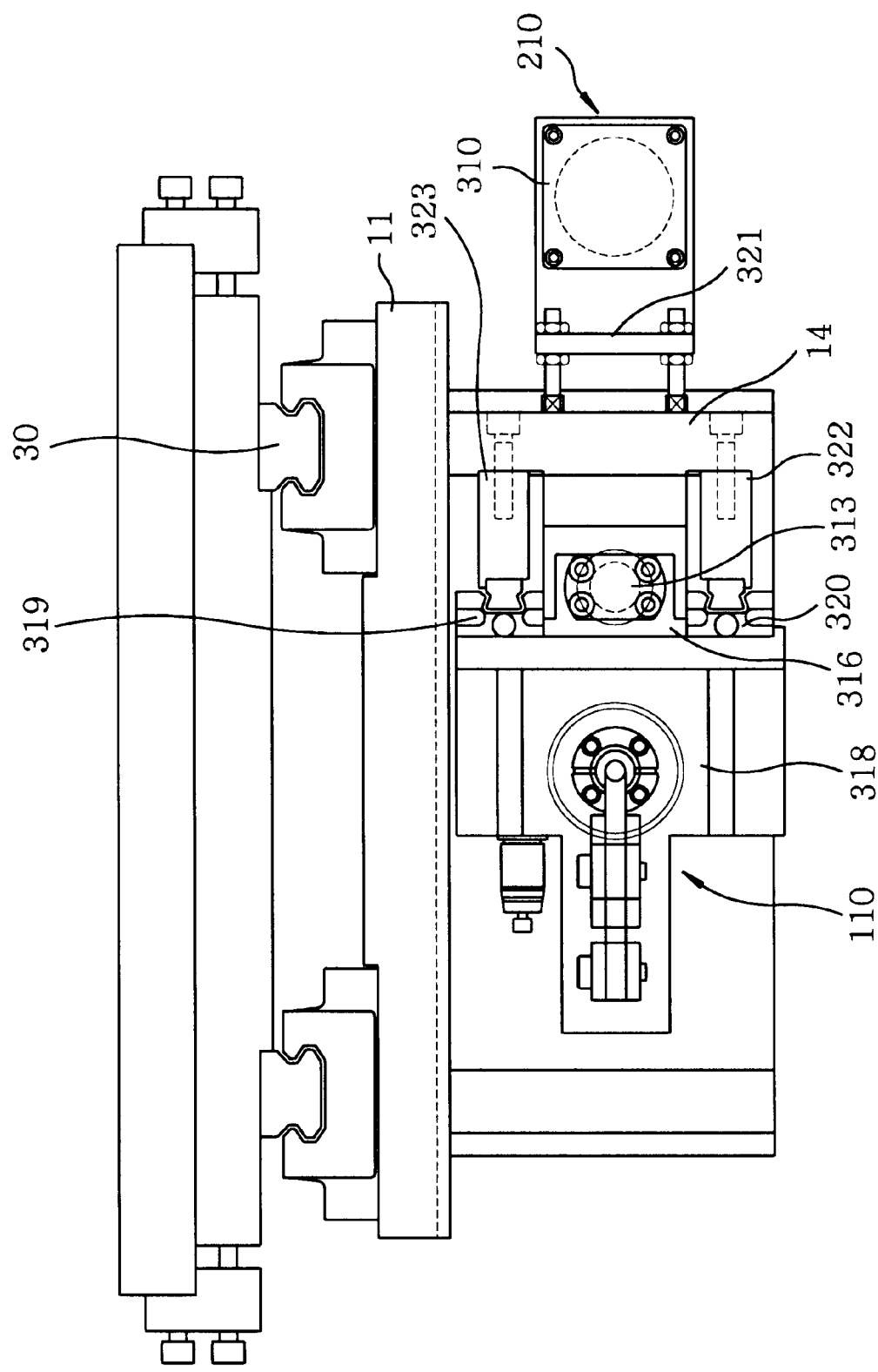
FIG. 8 provides a plane view of the gas filling unit in accordance with the present invention.
Figure 9:
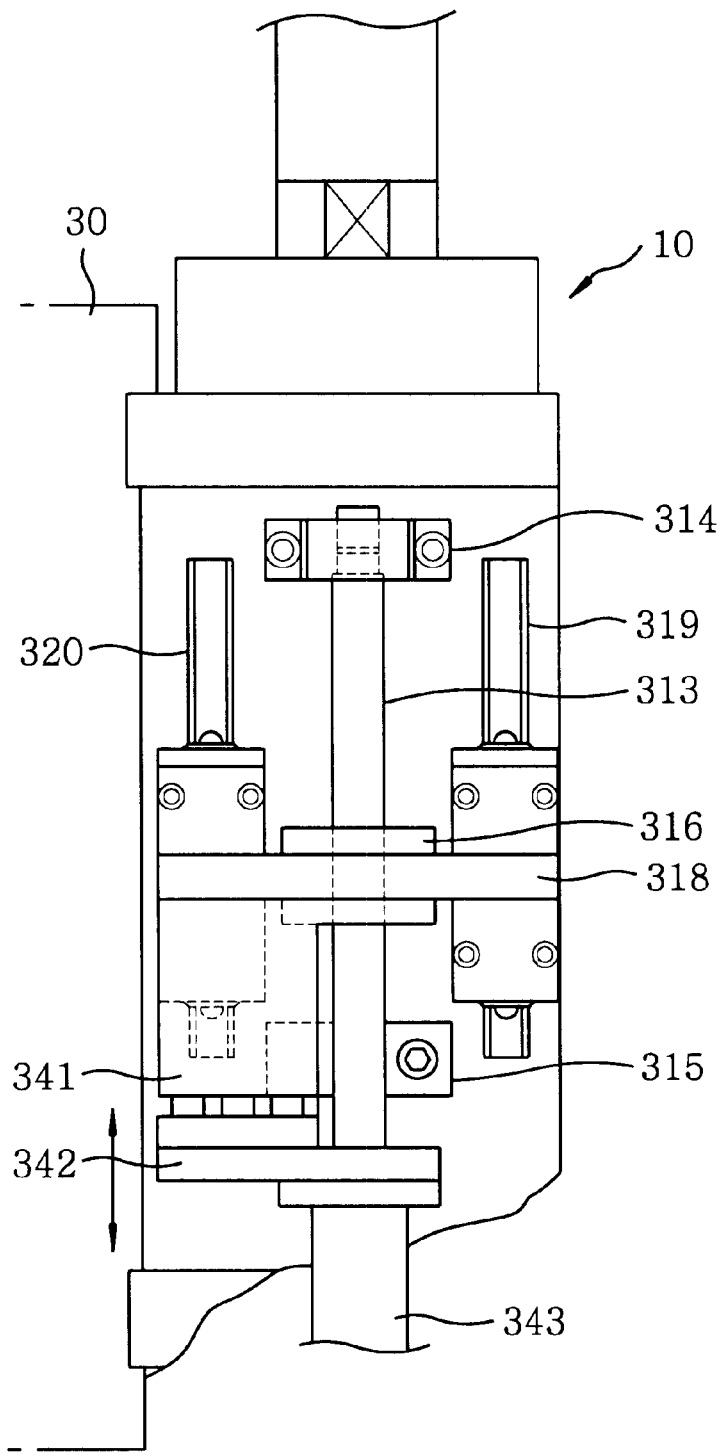
FIG. 9 represents a side view of the gas filling unit in accordance with the present invention.
Figure 10:
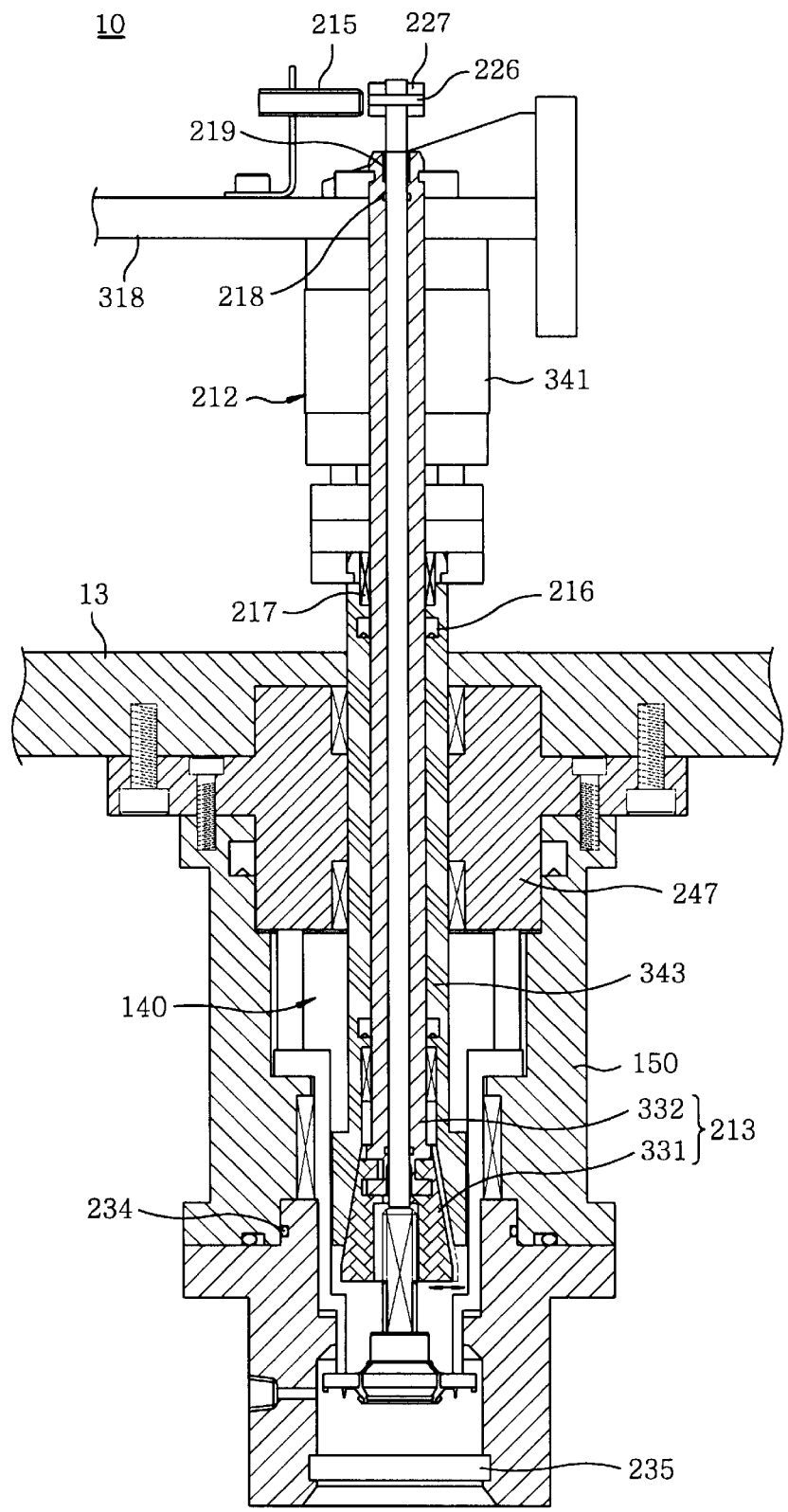
FIG. 10 shows a frontal view of inner structure of the gas filling unit in accordance with the present invention.

FIGS. 7, 8, and 9 respectively offer a frontal view, a plane view, and a side view of the gas filling unit 10 in accordance with the present invention. FIG. 10 shows a frontal view of an enlargement of the inner structure of the gas filling unit 10 in accordance with the present invention.

As described above, the gas filling unit 10 includes the rod chucking unit 110, the calking jig 130, an oil seal pushing unit 140, and the jig housing 150.

Meanwhile, a base plate 11 for supporting the gas filling unit 10 is installed on the frame 60 via the motor guide 30 and is elevated by the gas filling unit elevating actuator 20.

A top plate 12 and a bottom plate 13 are horizontally fixed and installed over and under the base plate 11. A side plate 14 is vertically installed at both ends of the top plate 12 and the bottom plate 13.

The rod chucking unit 110 is installed next to the side plate 14. The jig housing 150 is fixed and installed under the bottom plate 13. The calking jig 130 is installed under the jig housing 150. The oil seal pushing unit 140 is installed in the jig housing 150. A collet housing 343 and a collet assembly 213 are vertically installed through the center portion of the jig housing 150.

Herein, the rod chucking unit 110 is for chucking the rod 71 in the base shell assembly 75 with a plurality of the collet 331, wherein the rod chucking unit 110 includes a rod chucking unit driving device 210, a collet housing device 212, a collet assembly 213, a rod detecting bar 214, and a rod detecting bar sensor 215.

The rod chucking unit driving device 210 includes a servomotor 310, a ball screw 313, a timing belt 317, a nut housing 316, a nut housing plate 318, and linear motor guides 319, 320, wherein the servomotor 310 is installed next to the side plate 14 by a fixing bracket 321; the ball screw is vertically installed to rotate by support blocks 314, 315 next to the side plate 14; the timing belt 317 is installed to transfer the driving power to pulleys 311, 312 installed under the servomotor 310 and a ball screw 313; the nut housing 316 is combined with the ball screw 313 to transform the rotational motion of the ball screw 313 to a linear motion thereof; the nut housing plate 318 is fixed and installed next to the nut housing 316; the linear motor guides 319, 320 are installed on the nut housing plate 318 in order to slidably engaged with linear motor blocks 322, 323 installed next to the side plate 14.

The ball screw 313 in the rod chucking unit driving device 210 is rotated by driving the servomotor 310. The nut housing 316 and the nut housing plate 318 are vertically elevated up and down by the rotation of the ball screw 313. The linear motor guides 319, 320 play a role to stably support reciprocating motion of the nut housing plate 318.

As described in FIG. 10, the collet housing device 212 and the collet assembly 213 are installed under the nut housing plate 318.

The collet assembly 213 includes a collet connecting bar 332 having a hollow portion inside thereof and a plurality of collets 331 at an end of the collet connecting bar 332, wherein each collet has an inclined-curved surface and said plurality of collets 331 have a circular cone structure, wherein the collet 331 secures an extra space in the joint portion such that it can horizontally move along a predetermined distance from the collet connecting bar 332.

Meanwhile, the collet housing device 212 is for tightening the collet 331 having the circular cone structure, wherein the collet housing device 212 includes a cylinder 341, a driving plate 342, and a collet housing 343, wherein the cylinder 341 is fixed and installed under the nut housing plate 318; the collet housing 343 is installed via the driving plate 342 to reciprocate in a vertical direction by the cylinder 341. With reference to FIG. 10, the collet housing 343 is formed of a cylindrical structure having a hollow portion and is slidably connected to reciprocate is between the jig housing 150 and outer circumference of the collet connecting bar 332. An end of the collet housing 343 forms a curve inclined in an opposite direction with respect to that of the collet 331 in such a way that a plurality of collet 331 are gradually tightened by making contact along the inclined surface as the collet housing 343 moves down.

That is, the rod inserted into the collet 331 is chucked. An O-ring 216 and a bush 217 are located between the collet housing 343 and the collet connecting bar 332 so that they are capable of sliding under a sealed condition.

The rod detecting bar 214 is inserted into hollow portion of the collet connecting bar 332 and contacts with the rod 71. A detecting portion 226 detected by a rod detecting bar detecting sensor 215 and a stopper 227 for stopping a descending movement of the rod detecting bar 214 are installed on top of the rod detecting bar 214, wherein the stopper is stopped by being suspended on top of the collet connecting bar 332 by a dead load, thereby stopping the rod detecting bar 214.

The rod detecting bar detecting sensor 215 is fixedly installed on the nut housing plate 318, whereupon the descending of the rod chucking unit 110 can be controlled by detecting it through the detecting portion 226, when the rod detecting bar 214 is lifted to a position higher than a predetermined height by the rod 71.

An O-ring 218 and a bush 219 are interposed between the collet connecting bar 332 and the rod detecting bar 214 so that the rod detecting bar 214 is capable of moving to the top and bottom while maintaining a gap between the collet connecting bar 332 and the rod detecting bar 214 sealed.

The rod chucking unit 110 is descended by the servomotor 310 in order to fill the gas through the top of the base shell assembly 75. When the rod 71 is inserted into the collet 331, the rod chucking unit 110 is stopped, which is achieved by the rod detecting bar 214 and the rod bar detecting sensor 215. Subsequently, the collet housing 343 is descended by the cylinder 341 and thereby the rod 71 is chucked by tightening the collet 331. Whereupon the chucked rod 71 is a little bit lifted upward and at the same time the oil seal-pushing unit 140 as well as the oil seal 74 is also lifted. Whereupon, a space for filling the gas is prepared between the top of the base shell assembly 75 and the oil seal 74.

Figure 11:
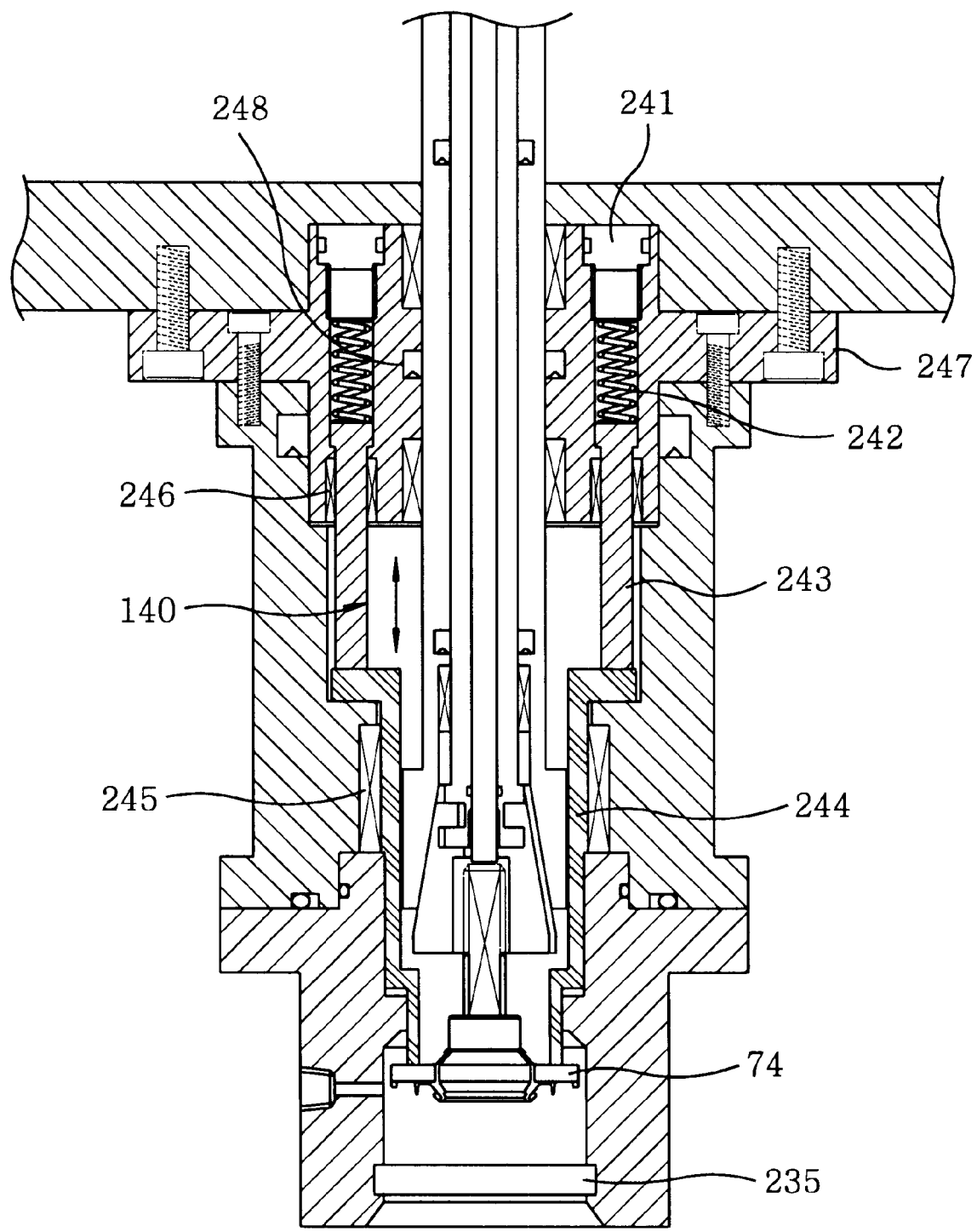
FIG. 11 offers a frontal view of an oil seal pushing unit in accordance with the present invention.

As shown in FIG. 11, the oil seal pushing unit 140 installed in the jig housing 150 is for pressurizing the oil seal 74 when lowering the gas filling unit 10. The oil seal pushing unit 140 has the structure for absorbing the driving power of the gas filling unit elevating actuator 20 to thereby prevent it from being directly transferred to the oil seal 74. The oil seal pushing unit 140 includes a pusher 244, a pin 243, a coil spring 242, a spring housing 247, and a spring bolt 241, wherein the pusher 244 makes a contact with the top of the oil seal 74; the pin 243 is installed on top of the pusher 244 along the working direction of an absorbing power, in order to provide the pusher 244 with the absorbing stroke; the coil spring 242 is fixated on top of the pin 243 to provide the pusher 244 with an absorbing power; the spring housing 247 for providing a space to insert the coil spring 242 and the end of the pin 243 is hermetically combined between the bottom plate 13 and the jig housing 150; the spring bolt 241 is bolt-combined on the top of the coil spring 242. Additionally, an O-ring 245 is inserted between the pusher 244 and the jig housing 150 so that the sliding contacting portion is hermetically maintained. An O-ring 246 is also inserted to be hermetic between the spring housing 247 and the pin 243. An O-ring 248 and a bush 249 are inserted to be hermetic in the sliding contacting portion positioned between the spring housing 247 and the collet housing 343.

In this way, the oil seal pushing unit 140 prevents an over pressure from being transferred to the oil seal 74 by compressing the coil spring 242, when the oil seal 74 is pressurized by the pusher 244 and an overload is applied.

Figure 12:
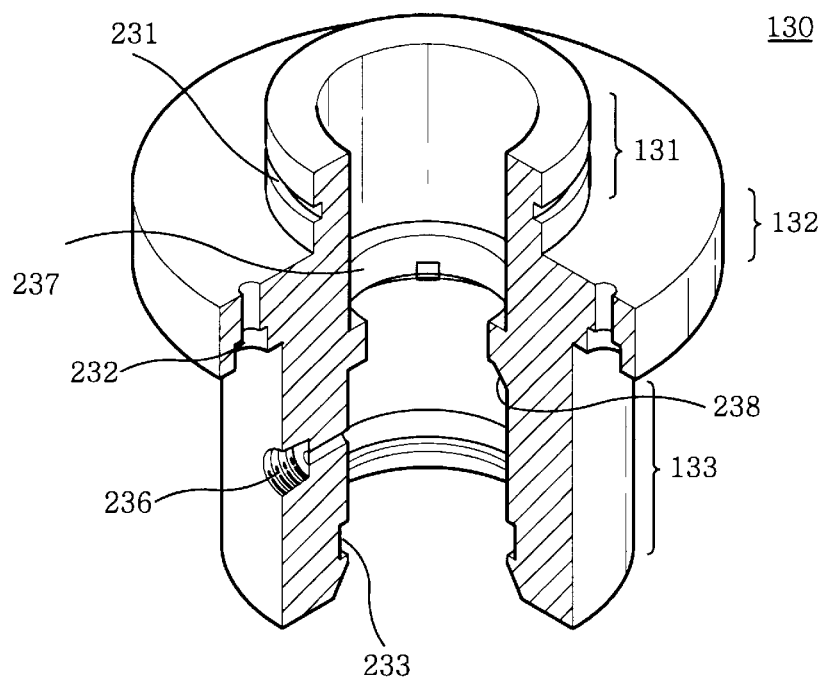
FIG. 12 provides a partial sectional schematic view of a calking jig in accordance with the present invention.

FIG. 12 provides a partial sectional schematic view of the calking jig in accordance with the present invention.

As described above, the calking jig 130 is fixed and installed under the jig housing 150, wherein the calking jig 130 includes a jig housing inserting portion 131, a flange portion 132, and a gas filling portion 133. The circumference surface of the jig housing inserting portion 131 forms an O-ring slot 231 in order to be hermetic therein; the flange portion 132 has a plurality of a bolt combining slot 232 in order to combine it with the jig housing 150; the inside of the gas filling portion 133 forms a packing slot 233 in order to be hermetic with the base shell assembly 75, wherein an O-ring 234 and a packing 235 are inserted in the O-ring slot 231 and the packing slot 233.

The inside diameter of the gas filling portion 133 is formed to correspond to the outside diameter of the base shell assembly 75. A gas filling hole 236 is formed at an end of the gas filling portion 133 to let the gas pass therethrough. The high-pressure gas is provided by connecting the gas providing line (not shown) to the gas filling hole 236.

A stage sill portion 237 is formed along the inner circumference at a top of an inner surface diameter of the gas filling portion 133. The inner diameter of the stage sill portion 237 is formed to correspond to the outer diameter of the pusher 244. A plurality of calking projection 238 are formed at a predetermined interval along lower inner circumferential surface under the stage sill portion 237, wherein the wedge-shaped calking projection presses on the top of the base shell assembly 75 to make it bent when the calking jig 130 is descended.

Figure 13:
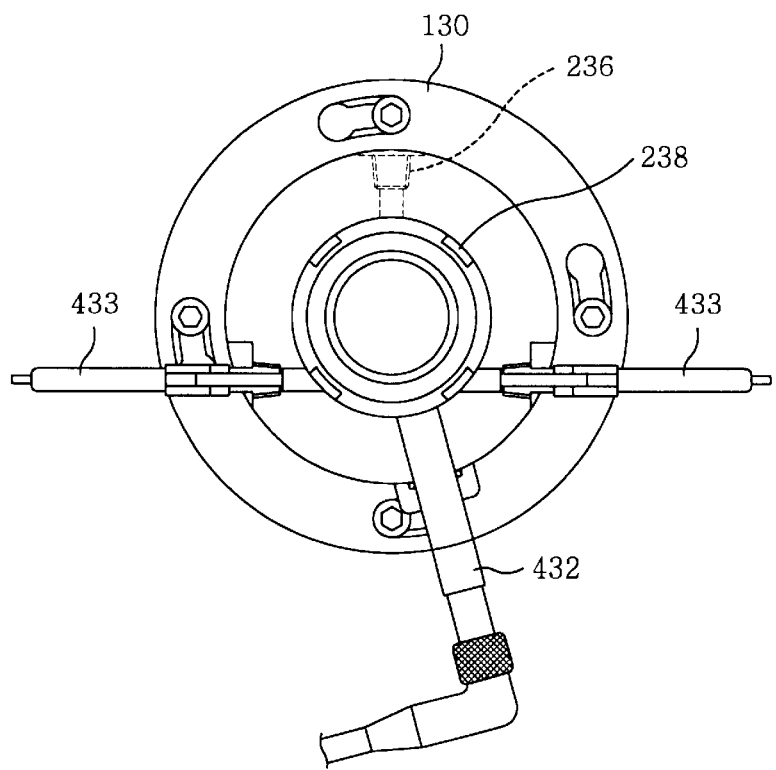
FIG. 13 represents a bottom view of the calking jig in accordance with the present invention.

Meanwhile, FIG. 13 represents a bottom view of the calking jig 130 in accordance with the present invention. The calking jig 130 includes a base shell assembly detecting sensor 432 and an oil seal detecting sensor 433, wherein the base shell assembly detecting sensor 432 is for stopping the descending of the gas filling unit 10 by detecting the top of the base shell assembly 75 entering into the gas filling portion 133; the oil seal detecting sensor 433 is for stopping the ascending of the rod chucking unit 110 by detecting the oil seal when the rod 71 and the oil seal 74 are lifted by the rod chucking unit 110. A base shell assembly detecting sensor 432 is applied to an approach sensor and an oil seal-detecting sensor 433 is applied to a light sensor.

Preferably, the base shell assembly detecting sensor 432 is installed at a proper height such that the gas filling portion 133 of caulking jig 130 can be inserted deep enough to make the top of the base shell assembly 75 be sealed.

Preferably, the oil seal-detecting sensor 433 is installed at a predetermined position higher than the position of the gas filling hole 236 such that the gas filling hole 236 can be positioned between the top of the base shell 75 and the displaced oil seal 74.

Figure 14:
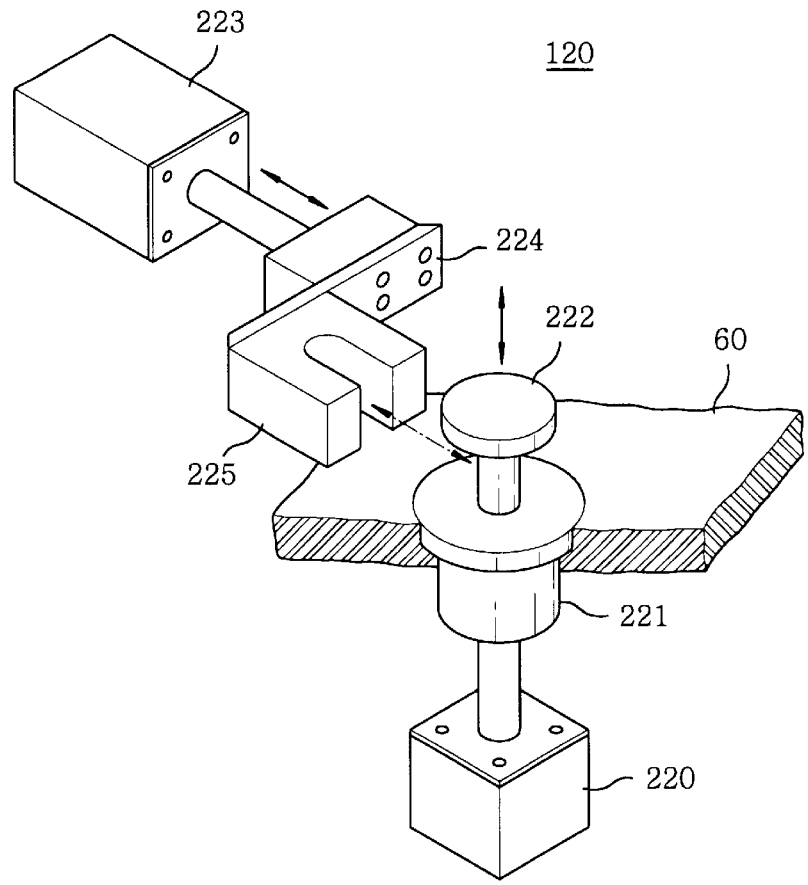
FIG. 14 shows a schematic view of a side lock device in accordance with the present invention.

FIG. 14 shows a schematic view of a side lock device 120 to prevent the load of the gas filling unit 10 from being transferred to the pallet-conveying device 50 supporting the base shell assembly 75.

As shown in FIG. 3, the side lock device 120 is installed for protecting the pallet-conveying device 50.

As described in FIG. 14, the side lock device 120 includes a driving support plate 222, a support plate elevating cylinder 220, a support sleeve 221, a support block 225, and a support block inserting cylinder 223, wherein the driving support plate 222 is installed to support the bottom plate of the pallet 80 to lift it up and down; the support plate elevating cylinder 220 is installed at a position lower than that of the frame 60 that is horizontally installed, wherein the support plate elevating cylinder 220 penetrates through the frame 60 and provides the driving support plate 222 with the elevating kinetic power; the support sleeve 221 is installed under the frame 60 in order to support the reciprocating motion of the rod of the support plate elevating cylinder 220;

the support block 225 is inserted between the driving support plate 222 and the frame 60 in order to make the load on the driving plate 222 be transferred to the frame 60; the support block inserting cylinder 223 is installed in order to make the support block 225 move horizontally. A bracket 224 is for combining the support block 225 and the support block-driving cylinder 223.

As described, when the pallet 80 for containing the base shell assembly 75 reaches the bottom of the gas filling unit 10, the side lock device 120 starts to operate. That is, the driving support plate 222 is ascended to the predetermined height by the support plate elevating cylinder 220 so that the pallet 80 is lifted and the space is prepared between the driving support plate 222 and the frame 60 where the support block 225 can move in and out. Subsequently, the support block 225 moves in the horizontal direction by the support block-driving cylinder 223 and is inserted between the frame 60 and the driving support plate 222. The load on the driving support plate 222 is induced to the frame 60 by the support block 225, thereby preventing the load from being transferred to the support plate elevating cylinder 220 and the pallet-conveying unit 50. A U-type slot 226 is formed in the support block 225 so that any interference with the rod of the support plate-elevating cylinder 220 can be avoided.

Figure 15:
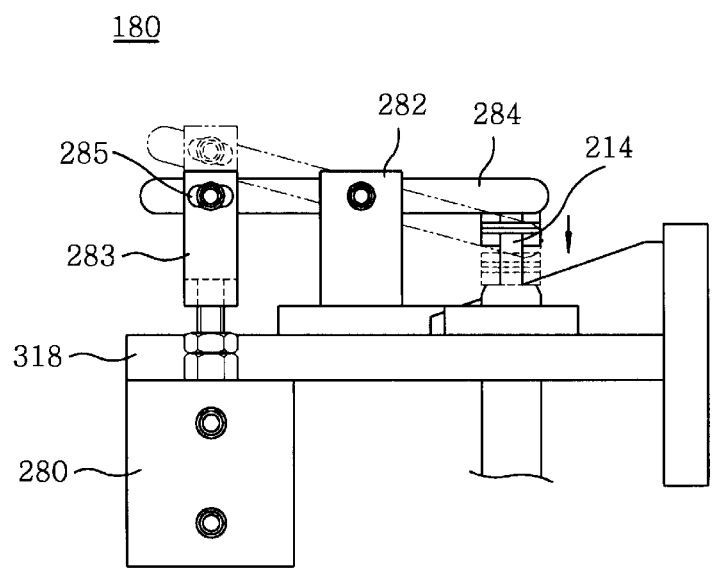
FIG. 15 offers a frontal view of a rod bar pushing device in accordance with the present invention.

FIG. 15 offers a frontal view of a rod bar pushing device 180 in accordance with the present invention, wherein the rod bar pushing device 180 is for pushing down the rod bar 214 lifted by the rod 71 while the rod chucking unit 110 is descended so that the rod bar 214 can be recovered to the primary position.

The rod bar pushing device 180 includes a cylinder 280, a hinge bar 284, and a hinge bracket 282, wherein the cylinder 280 is vertically fixed and installed at an end of the nut housing plate 318; one side of the hinge bar 284 is hinged and combined with an end portion of the rod of the cylinder 280 and the other side thereof is located on top of the rod detecting bar 214; the hinge bracket 282 supports the middle portion of the hinge bar 284 in order that the hinge bar 284 can perform a lever motion. The knuckle 283 is for absorbing a displacement caused by a curved motion of the hinge combining point resulted from hinge combination of the rod of the cylinder 280 and the hinge bar 284. The widthwise displacement caused by the curved motion of the hinge combining point is absorbed by the long hole 285 installed horizontally at the hinge combining portion.

The gas filling method using the gas filling apparatus for the gas shock absorber in accordance with the present invention is as follows.

Figure 16:
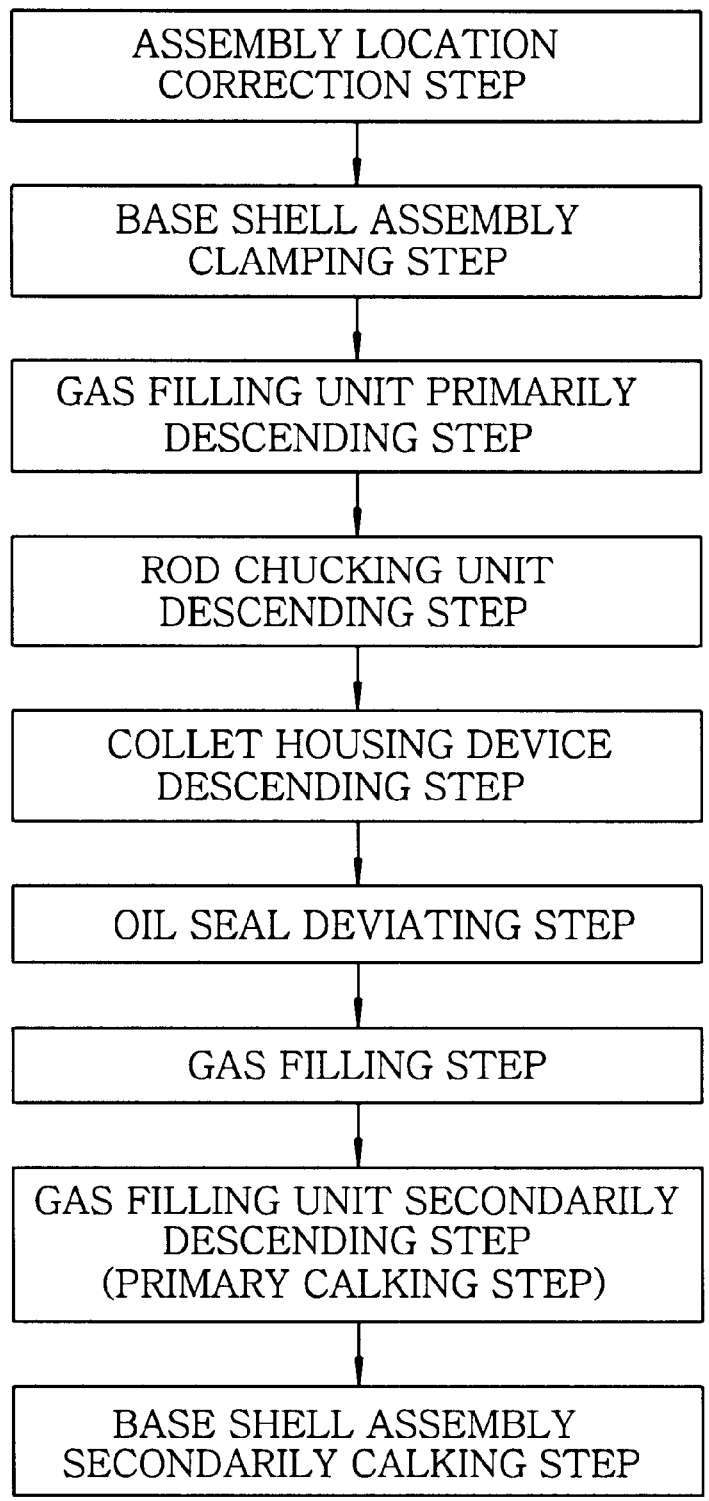
FIG. 16 provides a process block view of a gas filling method in accordance with the present invention.
Figure 17:
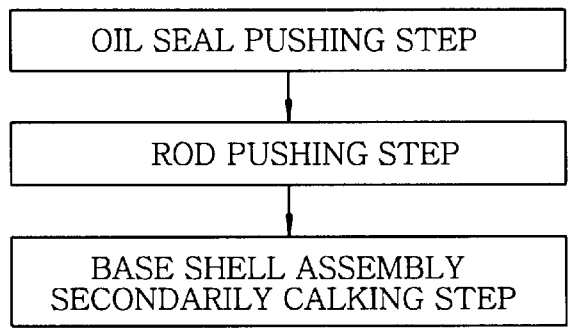
FIG. 17 represents a process block view of a rod-pushing step in accordance with the present invention.

FIG. 16 provides a process block view of the gas filling method in accordance with the present invention. As described, the gas filling method comprises the steps of correcting the assembly location in order that the tube assembly 72 and the rod guide 73 are fixed in the predetermined position, clamping the base shell assembly 75 transferred to the gas filling unit 10, lowering the gas filling unit 10 primarily for sealing the top of the base shell assembly 75 by the calking jig 130, lowering the rod chucking unit 110 for letting the bolt portion of the rod enter into the collet 331, lowering the collet housing device 212 for chucking the bolt portion of the rod by the collet 331, letting the oil seal break away from the top of the base shell assembly 75 by lifting the rod chucking unit 110, filling the gas between the oil seal and the top of the base shell assembly 75, lowering the gas filling unit 10 secondarily for inserting the oil seal into the top of the base shell assembly 75 and simultaneously, calking primarily the top of the base shell assembly 75 by the calking projection projected to the inside of the calking jig 130, and calking secondarily the base shell assembly 75 that is calked primarily by separating it from the gas filling unit 10.

The assembly location correction step is divided into a base shell assembly clamping step performed by the base shell assembly clamping unit 160 and a rod pushing step performed by the rod pushing unit 170.

In the base shell assembly clamping step, the base shell assembly 75 transferred from the antecedent process is adjusted to be positioned under the rod pushing unit 170.

In the rod pushing step, the top of the oil seal 74 is pushed by lowering the driving plate 374, the flange 378, the guide bar 380, and the oil seal pushing portion 381 by compressing the compact cylinder 373. The joint bar 382 and the rod pressurizing plate 283 moves downwards when the cylinder 371 is extended to the bottom direction, thereby pushing the top surface of the rod 71 by the rod pushing portion 384. Thereafter, the oil seal pushing portion 381 is slowly lifted by extending the compact cylinder 373 which results in lifting the oil seal 74, that, in turn, allows the compressed air located in the base shell assembly 75 to be exhausted to the outside.

Meanwhile, the assembly location correction step, as mentioned above, can be selectively omitted depending on the pulling extent of the rod 71 transferred through the antecedent process. That is, by employing the rod pulling extent detecting sensor, the assembly location correction step is omitted if the pulling location of the rod 71 is determined to be lower than the predetermined position and the assembly location correction step is performed if the pulling location of the rod 71 is determined to be higher than the predetermined position.

The base shell assembly 75 whose assembly location is corrected in the assembly location correction unit 90 is transferred to the gas filling unit 10 after being loaded on the pallet 80.

It is preferable that the pallet 80 and the base shell assembly 75, transferred to the gas filling unit 10, perform the side lock inserting step before performing the base shell assembly clamping step.

Figure 18:
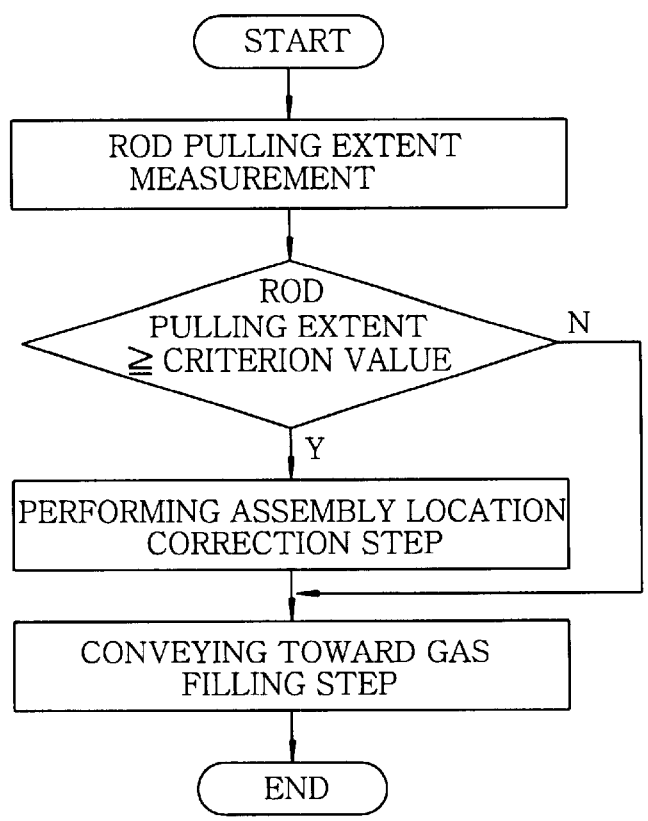
FIG. 18 shows a process flow chart for selectively performing an assembly location correction step in accordance with the present invention.

As described in FIG. 18, in the side lock inserting step, the driving support plate 222 is lifted to a predetermined position by the support plate elevating cylinder 220, thereby lifting the pallet 80, which in turn results in making a space between the frame 60 and the driving support plate 222 available so that the support block 225 can move in and out. The load on the driving support plate 222 is prevented from being transferred to the support plate ascending and descending cylinder 220 and the pallet-transferring unit 50. Instead, the load is guided to the frame 60 by the support block 225.

As shown in FIG. 3, the base shell assembly 75 lifted by the side lock device 120 is clamped by the base shell-fixing unit 40.

Subsequently, the gas filling unit 10 is primarily lowered by the gas filling unit elevating actuator 20. The gas filling unit 10 is lowered until the base shell detecting sensor 232 makes a contact with the top of the base shell assembly 75. By primarily lowering the gas filling unit 10, the outer circumference of the top of the base shell is inserted into the gas filling portion 133 located in the calking jig 130 deep enough to be sealed.

Subsequently, the rod chucking unit 110 is lowered by the rod chucking unit driving device 210. The descending of rod chucking unit 110 is stopped when the rod detecting bar 214 is lifted high enough by the insertion of the bolt portion of the rod 71 into the collet 332 so that the detecting portion 216 located at the rod detecting bar 214 is detected by the rod detecting bar sensor 215.

Meanwhile, in the rod chucking unit driving device 210, the ball screw 313 is rotated by the driving of the servomotor 310. The nut housing 316 and the nut housing plate 318 are vertically elevated up and down by the revolution of the ball screw 313.

Subsequently, the collet housing 343 is lowered by the cylinder 341 of the collet housing device 212. Since end portion of the collet housing 343 is formed of a circular cone structure inclined in a direction opposite to that of the circular cone of the collet 331, the more the end portion of the collet housing 343 is lowered, the more a plurality of collet 331 can be gradually tightened.

Subsequently, the rod 71 chucked by the collet 331 is lifted together when the rod chucking unit 110 is lifted. At this time, since the oil seal pushing unit 140 is operated and lifted, the space between the top of the base shell assembly 75 and the oil seal 74 is prepared for filling the gas by lifting the oil seal 74. The servomotor 310 located at the rod chucking unit 110 is stopped when the detecting signal is inputted by the oil seal detecting sensor 433.

Continuously, the gas is filled through the gas filling hole 236.

After the gas is sufficiently filled, the gas filling unit 10 is secondarily lowered. While the oil seal 74, lifted by the secondary descending of the gas filling unit 10, is inserted into the top of the base shell 75, the primary calking is performed at the same time.

Meanwhile, the oil seal pushing unit 140 damps the driving power from the gas filling unit elevating actuator 20 which is directly transferred to the oil seal 74, when lowering the gas filling unit 10. The oil seal pushing unit 140 plays a role for preventing the oil seal 74 from being damaged by making the optimum load added.

That is, when the oil seal 74 is pressurized by the pusher 244, the coil spring is compressed to thereby preventing the over pressurizing power from being transferred to the oil seal 74.

Meanwhile, the primary calking is performed by the calking projection 238 lowered by the pressurizing power from the gas filling unit elevating actuator 20.

As stated above, the base shell assembly 75 after completing the gas filling and the primary calking is subject to the secondary calking and a finishing process.

Meanwhile, the rod bar pushing device 180 plays a role for pushing down the rod bar 214 to return it to an original position after it is lifted by the rod 71, when the rod chucking unit 110 is lowered.

While the present invention has been shown and described with reference to the particular embodiments, it will be apparent to those skilled in the art that many changes and modifications may be made without departing from the spirit and scope of the invention defined in the appended claims.

What is claim is:

1. A gas filling apparatus for filling a gas in a base shell assembly of a shock absorber, comprising:
   an assembly location correction unit for putting a tube assembly and a rod guide at predetermined positions, respectively, in the base shell assembly by pushing a rod lifted by oil pressure filled in the base shell assembly; and
   a gas filling unit including a rod chucking unit, a calking jig, an oil seal pushing unit, and a jig housing, wherein the gas filling unit is capable of sealing top of the base shell assembly by calking temporarily after the gas is filled therethrough.

2. The gas filling apparatus of claim 1, wherein the gas filling unit is installed at a frame through the intermediary of a linear motor guide to be elevated by a gas filling unit elevating actuator.

3. The gas filling apparatus of claim 1, wherein the assembly location correction unit includes a base shell assembly clamping unit and a rod pushing unit,
   wherein the base shell assembly clamping unit clamps the base shell assembly; and
   the rod pushing unit is for independently pressurizing an oil seal and the rod located in the base shell assembly.

4. The gas filling apparatus of claim 1, wherein the rod chucking unit includes a rod chucking driving device, a collet housing device, a collet assembly, a rod detecting bar, and a rod detecting sensor.

5. The gas filling apparatus of claim 1, wherein the oil seal pushing unit includes a pusher, a pin, a coil spring, a spring housing, and a spring bolt,
   wherein the pusher makes a contact with top of an oil seal;
   the pin is installed on top of the pusher along a working direction of an absorbing power, to provide the pusher with an absorbing stroke;
   the coil spring is fixated on top of the pin to provide the pusher with an absorbing power;
   the spring housing provides a space into which the coil spring and end of the pin are inserted and is hermetically combined between the bottom plate and the jig housing; and
   the spring bolt is bolt-combined on top of the coil spring.

6. The gas filling apparatus of claim 1, wherein the calking jig includes a jig housing inserting portion, a flange portion, and a gas filling portion.

7. A gas filling method for filling a gas in the base shell assembly of the shock absorber, comprising the steps of:
   correcting an assembly location of a tube assembly and a rod guide in order to fix a predetermined position thereof;
   clamping a base shell assembly transferred to a gas filling unit;
   lowering the gas filling unit primarily for sealing top of the base shell assembly by a calking jig;
   lowering a rod chucking unit for letting a bolt portion of a rod enter into a collet;
   lowering a collet housing device for chucking the bolt portion of the rod by the collet;
   letting the oil seal break away from top of the base shell assembly, thereby lifting the rod chucking unit;
   filling a gas between the oil seal and the top of the base shell assembly;
   lowering the gas filling unit secondarily for inserting the oil seal into the top of the base shell assembly and simultaneously, calking primarily the top of the base shell assembly by a calking projection projected to inside of the calking jig; and
   calking secondarily the base shell assembly that is calked primarily, thereafter separating it from the gas filling unit.

8. The gas filling method of claim 7, wherein the assembly location correction step includes a base shell assembly clamping step by a base shell assembly clamping unit and a rod pushing step by a rod pushing unit.

9. The gas filling method of claim 8, wherein the rod pushing step includes the steps of:
pushing the oil seal by lowering an oil seal pushing portion after compressing a compact cylinder;
pushing top of the rod by lowering the rod pushing portion by extension of a cylinder;
exhausting a compressed air located in the base shell assembly by lifting the oil seal pushing portion.

10. The gas filling method of claim 9, wherein the oil seal pushing step is for absorbing the driving power of the gas filling unit elevating actuator to prevent it from being transferred directly to the oil seal.

11. The gas filling method of claim 7, wherein the assembly location correction step can be selectively omitted if a pulling location of the rod 71 is determined to be lower than a predetermined position by a rod pulling extent detecting sensor and can be performed if pulling location of the rod 71 is determined to be higher than the predetermined position.

12. The gas filling method of claim 7, wherein primarily lowering step of the gas filling unit is controlled by an approach sensor.

13. The gas filling method of claim 7, wherein the rod chucking unit lowering step is controlled by a rod detecting bar.

14. The gas filling method of claim 7, wherein letting the oil seal break away step is controlled by an oil seal detecting sensor.

15. The gas filling method of claim 7, wherein in the gas filling unit secondarily lowering step, the oil seal is inserted into the top of the base shell assembly by an oil seal pushing unit.

* * * * *